United States Patent
Saffar et al.

(10) Patent No.: US 11,216,778 B2
(45) Date of Patent: Jan. 4, 2022

(54) AUTOMATIC DETECTION OF DISRUPTIVE ORDERS FOR A SUPPLY CHAIN

(71) Applicant: EMC IP Holding Company LLC, Hopkinton, MA (US)

(72) Inventors: Or Herman Saffar, Beer Sheva (IL); Mridul Vinay Garg, Austin, TX (US); Oshry Ben-Harush, Kibutz Galon (IL)

(73) Assignee: EMC IP Holding Company LLC, Hopkinton, MA (US)

(*) Notice: Subject to any disclaimer, the term of this patent is extended or adjusted under 35 U.S.C. 154(b) by 188 days.

(21) Appl. No.: 16/587,368

(22) Filed: Sep. 30, 2019

(65) Prior Publication Data

US 2021/0097479 A1 Apr. 1, 2021

(51) Int. Cl.
*G06Q 10/08* (2012.01)
*G06Q 30/06* (2012.01)
*G06N 20/00* (2019.01)

(52) U.S. Cl.
CPC ........... *G06Q 10/087* (2013.01); *G06N 20/00* (2019.01); *G06Q 30/0637* (2013.01)

(58) Field of Classification Search
CPC .. G06Q 30/0637; G06Q 10/087; G06Q 10/08; G06Q 30/06; G06N 20/00
USPC .......................................................... 705/28
See application file for complete search history.

(56) References Cited

U.S. PATENT DOCUMENTS

| | | | | |
|---|---|---|---|---|
| 7,617,136 B1* | 11/2009 | Lessing | ............... | G06Q 10/087 705/22 |
| 7,769,595 B2* | 8/2010 | Lopez | ............... | G06Q 10/087 705/1.1 |
| 7,783,523 B2* | 8/2010 | Lopez | ............... | G06Q 10/087 705/26.8 |
| 7,840,462 B2* | 11/2010 | Hansen | ............. | G06F 16/24578 705/35 |
| 8,204,809 B1* | 6/2012 | Wise | ............... | G06Q 40/06 705/35 |
| 10,127,125 B2* | 11/2018 | Krishnan | ............ | G06F 11/0751 |
| 10,380,589 B2* | 8/2019 | Studnitzer | .......... | G06Q 20/4014 |
| 10,392,022 B1* | 8/2019 | Rau | ................ | B60W 40/12 |

(Continued)

OTHER PUBLICATIONS

Jackson, Joab, "How Uber Eats Uses Machine Learning to Estimate Delivery Times", downloaded on Sep. 25, 2019 from https://thenewstack.io/how-uber-eats-uses-machine-learning-to-estimate-delivery-times/.

(Continued)

*Primary Examiner* — Andrew Joseph Rudy
(74) *Attorney, Agent, or Firm* — Ryan, Mason & Lewis, LLP

(57) ABSTRACT

Techniques are provided for automatically detecting disruptive orders for a supply chain. One method comprises obtaining a quote for an order; extracting features from the quote; and applying the extracted features to a disruptive quote machine learning engine that generates an anomaly score indicating a likelihood that the quote will cause a disruption, based on one or more predefined disruption criteria. The disruptive quote machine learning engine may employ an isolation forest algorithm and/or a multi-dimensional anomaly detection algorithm. The disruptive quote machine learning engine may be trained using historical order information comprising part-level information from historical orders and/or a manufacturing production plan comprising an inventory forecast.

20 Claims, 6 Drawing Sheets

(56) References Cited

U.S. PATENT DOCUMENTS

| | | | |
|---|---|---|---|
| 10,695,907 B2* | 6/2020 | Chattopadhyay .. | G05B 23/0272 |
| 10,733,672 B1* | 8/2020 | Bernstein ........... | G01C 21/3438 |
| 10,789,648 B2* | 9/2020 | Bland ................... | G06Q 40/06 |
| 10,839,071 B2* | 11/2020 | Lamothe-Brassard | ...................... |
| | | | G06F 21/554 |
| 10,853,751 B2* | 12/2020 | Crane, Jr. ........ | G06Q 10/06315 |
| 10,902,062 B1* | 1/2021 | Guha .................. | G06F 16/215 |
| 10,997,649 B2* | 5/2021 | Smoot ................ | G06Q 30/0641 |
| 11,021,166 B2* | 6/2021 | Rau ........................ | H04W 4/38 |
| 11,037,071 B1* | 6/2021 | Tekiela ................ | G06K 9/4652 |
| 2016/0335697 A1* | 11/2016 | Bawri ................ | G06Q 30/0629 |
| 2020/0210890 A1* | 7/2020 | Xu ........................ | G06N 20/00 |
| 2020/0374720 A1* | 11/2020 | Li ........................ | G06N 5/003 |
| 2020/0380571 A1* | 12/2020 | Ramakrishnan ... | G06K 9/00523 |
| 2021/0026722 A1* | 1/2021 | Bhatia .................. | G06F 11/079 |
| 2021/0056562 A1* | 2/2021 | Hart .................. | G06Q 20/4014 |

OTHER PUBLICATIONS

"Detecting Disruption Early—Disrupt & Innovate", downloaded on Sep. 25, 2019 from https://disrupt-and-innovate.org/detecting-disruption-early/.

* cited by examiner

AUTOMATIC DETECTION OF DISRUPTIVE ORDERS FOR A SUPPLY CHAIN

FIELD

The field relates generally to information processing, and more particularly, to the processing of orders, for example, in a supply chain.

BACKGROUND

A supply chain process is often comprised of a number of quotes and orders, where some of the quotes will be converted into orders. When a new order is placed, it is desirable to deliver the new order on time to the appropriate customer(s). Thus, when future orders are placed, it is desirable to have the correct inventory in place to support all orders. A quote is often a combination of multiple orders and is typically broken down into orders based upon capacity constraints.

There is a need for improved techniques for notifying supply chain teams of quotes that might be disruptive for the supply chain (e.g., orders that might cause delays and/or an inability to deliver future orders on time).

SUMMARY

In one embodiment, a method comprises obtaining a quote for an order; extracting one or more features from the quote; and applying the extracted features to a disruptive quote machine learning engine that generates an anomaly score indicating a likelihood that the quote will cause a disruption, based on one or more predefined disruption criteria, wherein the disruptive quote machine learning engine is trained using historical order information. In addition, a user can be provided with one or more predefined factors that contribute to the anomaly score.

In some embodiments, the disruptive quote machine learning engine employs an isolation forest algorithm. In addition, the disruptive quote machine learning engine may employ a multi-dimensional anomaly detection algorithm.

In at least one embodiment, the disruptive quote machine learning engine is trained using historical order information, such as part-level information of historical orders. In addition, the training data for the disruptive quote machine learning engine may further comprise a manufacturing production plan comprising an inventory forecast.

Other illustrative embodiments include, without limitation, apparatus, systems, methods and computer program products comprising processor-readable storage media.

DETAILED DESCRIPTION

Figure 1:
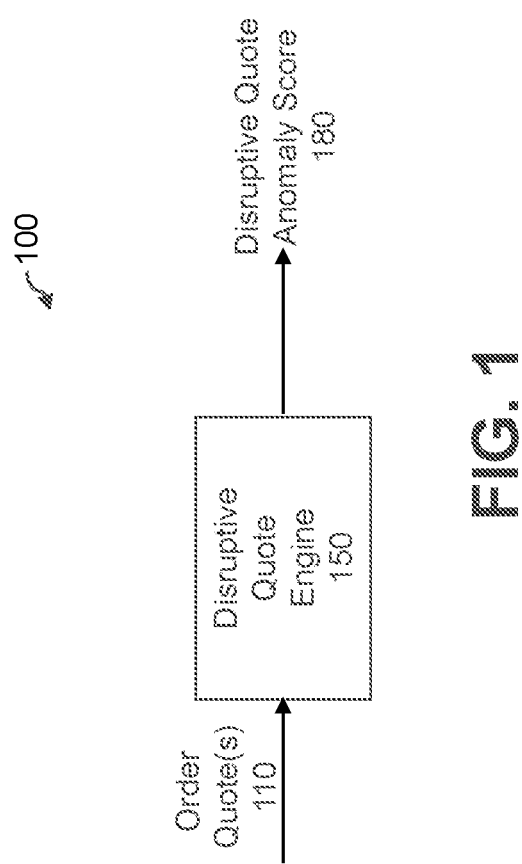
FIG. 1 illustrates an exemplary implementation of a disruptive quote detection system, according to at least one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for automatically detecting disruptive orders for a supply chain.

One or more embodiments of the present disclosure provide techniques for automatically detecting disruptive orders for a supply chain. In some embodiments, statistical methods and machine learning algorithms are employed for disruptive quote detection, using characteristics of the quote and information from historical orders. The disclosed exemplary system provides an anomaly score for each quote, informing a supply chain analyst, for example, with a sorted list of quotes that are likely to be disruptive for the supply chain. Information about each disruptive quote can also be given to the supply chain analyst, to help him or her understand the reason why the order may be disruptive.

In some embodiments, a disruptive order may be characterized by one or more predefined disruption criteria, such as orders that might cause delays and/or orders that cause an inability to deliver future orders on time. In further variations, a disruption could be, for example, a material shortage due to low inventory or market constraints, or a disruption could be a failure to fulfill the order within the time promised to the customer, or another unforeseeable reason due to which a customer order cannot be fulfilled. In addition, an ordered part might be a last time buy or a purchase of part on back order, which would mean additional sourcing efforts for the part.

A large enterprise may employ an exception process setup to fulfill large orders (LO) from customers, referred to herein as an LO process. Generally, an LO process ensures that a supply chain has high visibility into potentially large orders from customers (and/or orders from important customers) to ensure that those orders get fulfilled without disruptions.

The LO process can help drive increased visibility into high volume orders from a sales organization, and also enforce stricter guidelines on the sales organization regarding the products and configurations that can be offered to customers. However, over time, the exception process can grow due to increasing consumer demand for the products of the enterprise. In some situations and enterprises, however, the LO process approach may burden those individuals or groups that monitor the LO process.

One or more embodiments of the present disclosure provide a holistic approach for the automatic detection of quotes that are likely to cause disruptive orders for the supply chain. In some embodiments, machine learning models are employed that leverage features that consider characteristics of the quote and the supply chain readiness.

Existing supply chain processes for disruptive quotes are typically based on a "large-order" definition. A large order (or a corresponding quote) may be defined in some embodiments as an order that comprises more than 100 systems or has revenue larger than $1000, for example. These numbers can be set manually by the business and are the only indicators for large orders. "Large orders" are not necessarily disruptive, as the supply chain can be prepared for them, having information from the sales representatives. Because these quotes are "large," they often have a longer sale process which can be leveraged to improve readiness by reserving relevant parts and systems.

Using the above "large order" method, quotes that contain unique, rare parts and/or parts with a low inventory will go undetected. For example, assume a company maintains an inventory of six items for a given rare system. Thus, a quote with nine of the given rare system can be placed but will not be detected by the above "large order" method as the minimum for large quote is defined as 100 systems in the above example. Thus, the supply chain may not be ready for this quote if it turns into an order, but a flag will not be raised.

In addition, existing supply chain processes typically only take into account one quote at a time. One or more aspects of the present disclosure recognize that there is often a lot of historical information available about orders that could infer on baseline quantities of systems and the current process is not leveraging this information at all.

For many enterprises, many products should be built in their factories. For these orders, part-level inventory is maintained and the product is constructed only when the order is placed. Current supply chain processes, however, consider only system-level information. When only one part of the order is missing, for example, the order will be disruptive but current processes will not provide any notification when the quote is placed.

Orders are typically marked as "large orders" based only on system quantities and the revenue associated with a given order. The supply chain analyst has no other insights about the order and must investigate for reasons why this order might be disruptive. This is a time-consuming process and requires supply chain proficiency.

Detection of Disruptive Supply Chain Order

As noted above, one or more embodiments of the disclosure provide techniques for automatically detecting disruptive orders for a supply chain. In some embodiments, statistical methods and machine learning algorithms are used by a disruptive quote engine to automate a detection of disruptive quotes, enabling the identification of non-trivial disruptive quotes and providing insights regarding each quote. The solution takes a new quote as an input and returns a disruptive score for the quote and possibly one or more automated actions, such as providing one or more human-readable insights and/or business-related insights required to handle the future order.

FIG. 1 illustrates an exemplary implementation of a disruptive quote detection system 100, according to at least one embodiment of the disclosure. As shown in FIG. 1, one or more quotes 110 for one or more orders are applied to a disruptive quote engine 150 that determines a likelihood that the one or more quotes 110 will be disruptive quotes. The disruptive quote engine 150 is implemented in some embodiments as a machine learning engine that generates a disruptive quote anomaly score 180 indicating a likelihood that the one or more quotes 110 will cause a disruption, based on one or more predefined disruption criteria, discussed below. The disruptive quote engine 150 is trained using historical order information, as discussed further below in conjunction with FIG. 2, to learn how to determine the anomaly score 180.

In some embodiments, the disruptive quote machine learning engine 150 is trained using characteristics of historical orders to learn how to detect disruptive quotes, as discussed further below in conjunction with FIG. 2. During real-time processing, new quotes 110 can then be applied to the disruptive quote machine learning engine 150 to automatically determine the disruptive quote anomaly score 180 for the new quotes 110.

Figure 2:
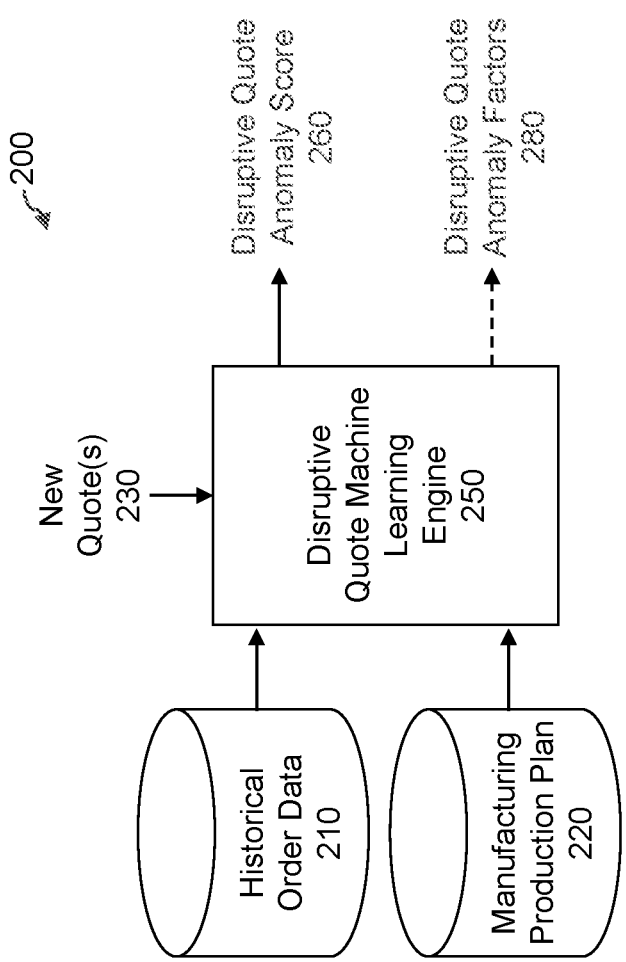
FIG. 2 illustrates an exemplary implementation of a disruptive quote detection system 200, according to an embodiment of the disclosure.

FIG. 2 illustrates an exemplary implementation of a disruptive quote detection system 200, according to an embodiment of the disclosure. Generally, the disruptive quote detection system 200 of FIG. 2 illustrates various aspects of the disruptive quote detection system 100 of FIG. 1 in further detail.

As shown in FIG. 2, historical order data 210 and a manufacturing production plan 220, each represented by a set of features as discussed further below, are applied to a disruptive quote machine learning engine 250 in the example of FIG. 2 during a training process. The disruptive quote machine learning engine 250 is trained during the training process in some embodiments using a multi-dimensional anomaly detection algorithm, as discussed further below.

As a new quote 230 is received in real-time, the new quote 230 is applied to the trained disruptive quote machine learning engine 250 that determines a disruptive quote anomaly score 260 and optionally one or more disruptive quote anomaly factors 280 that contribute to the disruptive quote anomaly score 260, as discussed further below. In some embodiments, the disruptive quote anomaly score 260 is represented as a normalized score between 0-1 indicating a disruptiveness of the order (generally, the higher the score, the more disruptive the quote).

In this manner, when a new quote 230 is processed, a set of features of the new quote 230 is applied to the disruptive quote machine learning engine 250, and the disruptive quote anomaly score 260 is determined. The disruptive quote anomaly score 260 may be determined, for example, by comparing features of a given new quote 230 to those of historical quotes to determine where to rank the given new quote 230 within the set of historical quotes. In addition, the disruptive quote anomaly factors 280 provide information about each new quote 230 to a user, to allow him or her to better understand the reasons why a given quote may be disruptive. Further, when several new quotes 230 are being placed, the user is provided with a list of disruptive quotes, for example, sorted by the disruptive quote anomaly score 260, such as from the most anomalous or disruptive quotes to the least anomalous or disruptive quotes.

In some embodiments, the set of features extracted from the historical orders may include part-level information within the historical order data 210, such as the number of each type of part within the order, and other characteristics of the order (e.g., region, products). For example, for a processing device, the part-level information within the historical order data 210 may indicate the number of solid-state storage devices (SSDs) and the number of processing elements within each historical order. In addition, the manufacturing production plan 220 may comprise a future inventory forecast for each end product or platform level product. The manufacturing production plan 220 may also optionally comprise part-level information as well. The manufacturing production plan 220 may be generated, for example, by a manufacturing/production planning team that adjusts existing available inventory based on expected sales.

As noted above, in some embodiments, the disruptive quote machine learning engine 250 is implemented using a machine learning multi-dimensional anomaly detection algorithm, such as an isolation forest algorithm.

Figure 3:
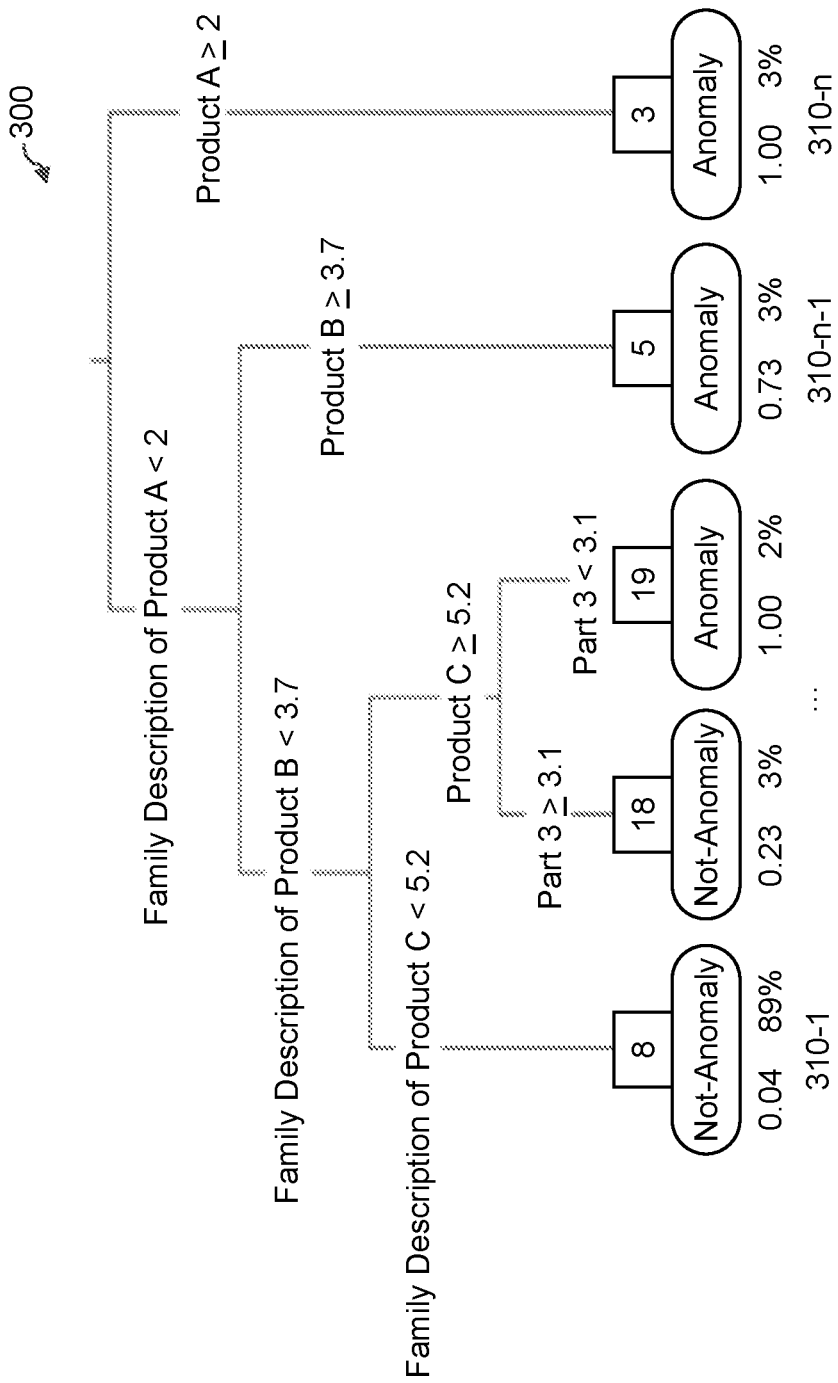
FIG. 3 illustrates a process employing a random decision tree of an isolation forest for anomaly detection within an exemplary implementation of the disruptive quote machine learning engine of FIG. 2, according to at least one embodiment.

FIG. 3 illustrates a process employing a random decision tree 300 of an isolation forest for anomaly detection within an exemplary implementation of the disruptive quote machine learning engine 250 of FIG. 2, according to at least one embodiment of the disclosure. Generally, the isolation forest uses the random decision tree 300 having a plurality of levels and a plurality of leaf nodes 310-1 through 310-*n* to isolate observations, in a known manner. In the example of FIG. 3, each leaf node 310 indicates the predicted class (e.g., anomaly or not-anomaly), the predicted probability of anomaly (e.g., the disruptive quote anomaly score 260) and the percentage of observations in the given leaf node 310. The number of splits by the isolation forest required to isolate a sample is equivalent to the path length from the root node of the random decision tree 300 to the terminating node, as would be apparent to a person of ordinary skill in the art.

In the example of FIG. 3, a random decision tree 300 is grown until each instance is an individual quote. Thus, if the decision tree were executed on 400 quotes, there would be 400 leaf nodes where each quote is in its own leaf node 310. In addition, leaf nodes 310 in the random decision tree 300 are harder to isolate for lower depths of the random decision tree 300. For example, leaf node 310-*n*–1 is harder to isolate than leaf node 310-1. The process is repeated several times and the average depth of each iteration is used to compute the disruptive quote anomaly score 260.

Generally, the isolation forest "isolates" observations by selecting features of a given quote (e.g., family descriptions of particular products or parts, as shown in FIG. 3) and selecting a corresponding split value between the minimum and maximum of the selected feature to make a selection at each level. Since this partitioning can be represented by a structure of the random forest tree 300, the number of splits required to isolate a sample is thus equivalent to the path length from the root node to the terminating node.

One or more aspects of the disclosure recognize that this partitioning produces noticeably shorter paths for detecting anomalies. The path length is a measure of normality and is the basis of the disclosed disruptive quote anomaly score 260. After training the isolation forest during the training process, the score is normalized to a range of 0-1 to produce the disruptive quote anomaly score 260. As noted above, in some embodiments, the higher the value of the disruptive quote anomaly score 260, the more anomalous the quote and therefore more disruptive.

Figure 4:
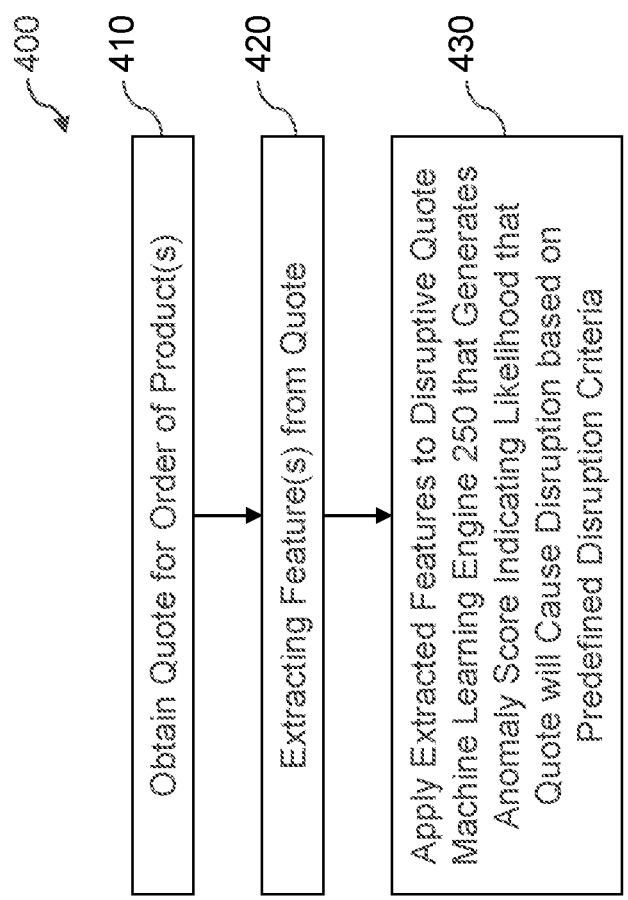
FIG. 4 is a flow chart illustrating an exemplary implementation of a disruptive quote detection process, according to one embodiment of the disclosure.

FIG. 4 is a flow chart illustrating an exemplary implementation of a disruptive quote detection process 400, according to one embodiment of the disclosure. As shown in FIG. 4, the disruptive quote detection process 400 initially obtains a quote for an order during step 410, and extracts one or more features from the quote during step 420.

During step 430, the exemplary disruptive quote detection process 400 applies the extracted features to the disruptive quote machine learning engine 250 that generates the disruptive quote anomaly score 260 indicating a likelihood that the quote will cause a disruption, based on one or more predefined disruption criteria. As discussed above, the disruptive quote machine learning engine 250 is trained using historical order data 210 and optionally the manufacturing production plan 220.

Consider a new quote 230 for a given server product that is received in the month of June. A full representation of the parts of the given server can be represented using a feature vector. Assume that the new quote 230 is for 220 units of the given server. The exemplary parts for this quote are as follows:

| Part | Part Type | Part Quantity |
|---|---|---|
| RDIMM_32GB_Total | Memory | 4848 |
| SATA_Boot_120 | SSD | 202 |
| Intel_8168_ | Processor | 2710 |

Assume further that the related manufacturing production plan 220 for June for this platform product is also considered, indicating a manufacturing production plan (MPP) of 1578 units, therefore the MPP feature extracted for this quote is the number of units divided by the MPP (220/1578=0.14).

Considering the above information, a snippet of the feature vector for this quote can be expressed in some embodiments as follows:

| SSD_SATA_Boot_120 | ... | Memory_RDIMM_32GB_Total | Processor_Intel_8168_ | ... | MPP |
|---|---|---|---|---|---|
| 202 | ... | 4848 | 2710 | ... | 0.14 |

The new quote 230 is applied to the disruptive quote machine learning engine 250, which produces the disruptive quote anomaly score 260, and optionally the disruptive quote anomaly factors 280 of the quote. For example, the above exemplary quote may have a low disruptive quote anomaly score 260 of 0.184, indicating that the quote is disruptive to the supply chain.

As noted above, part-level information of each quote can be represented using quantities of each part on each quote. For example, an exemplary quote may comprise three parts from SSD type A and 1 part from Memory type D.

In addition, an inventory forecast, such as an manufacturing production plan 220 determined, for example, by a sales unit, can also be leveraged in some embodiments. The manufacturing production plan 220 can be used to complete the inventory and to be prepared for future orders. One or more aspects of the disclosure recognize that incorporating manufacturing production plan information into the disclosed disruptiveness detection techniques can solely mark a given quote as disruptive. If the manufacturing production plan for a specific month is 10 units, the inventory will keep this number of units. If a new quote contains 11 units, there is a high probability for a supply chain disruption, as forecasted inventory will not be able to provide the order.

In one or more embodiments, the manufacturing production plan information is leveraged as follows:

1. MPP is the expected number of platforms that will be needed in a specific week (for example, where the MPP is given for a specific week, one month in advance);

2. When a new quote arrives and contains platform X, the MPP for platform X for the current week is considered;

3. The MPP feature for this quote is computed as follows:

$$MPP_{part\ X} = \frac{\text{Platform } X \text{ quantity in the quote}}{\text{Platform } X \text{ MPP for this week}}$$

This equation represents the percentage of platform X in this quote out of the expected total quantity among all orders.

4. MPP feature is appended to the original set of features for each order.

Among other benefits, by training the disruptive quote machine learning engine 250 on historical orders, prior knowledge on common orders is employed. In this manner, a disruptive quote can be recognized when the disruptive quote is place, by comparing the new quote to the baseline employed by the disruptive quote machine learning engine 250.

In one or more embodiments, the disclosed techniques for automatically detecting disruptive orders for a supply chain leverage statistical methods and machine learning algorithms for disruptive orders detection. Multi-dimensional anomaly detection techniques (such as the isolation forest, described above) can process characteristics of a given quote and return a disruptive quote anomaly score 260. The quotes with the highest scores (for example) have a high probability of being disruptive for the supply chain. This method is comparative and allows a detection of quotes that are disruptive compared to other quotes.

One or more embodiments of the disclosure provide improved methods, apparatus and computer program products for automatically detecting disruptive orders for a supply chain. The foregoing applications and associated embodiments should be considered as illustrative only, and numerous other embodiments can be configured using the techniques disclosed herein, in a wide variety of different applications.

It should also be understood that the disruptive quote detection techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for automatically detecting disruptive orders for a supply chain may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based disruptive quote detection engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based disruptive quote detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
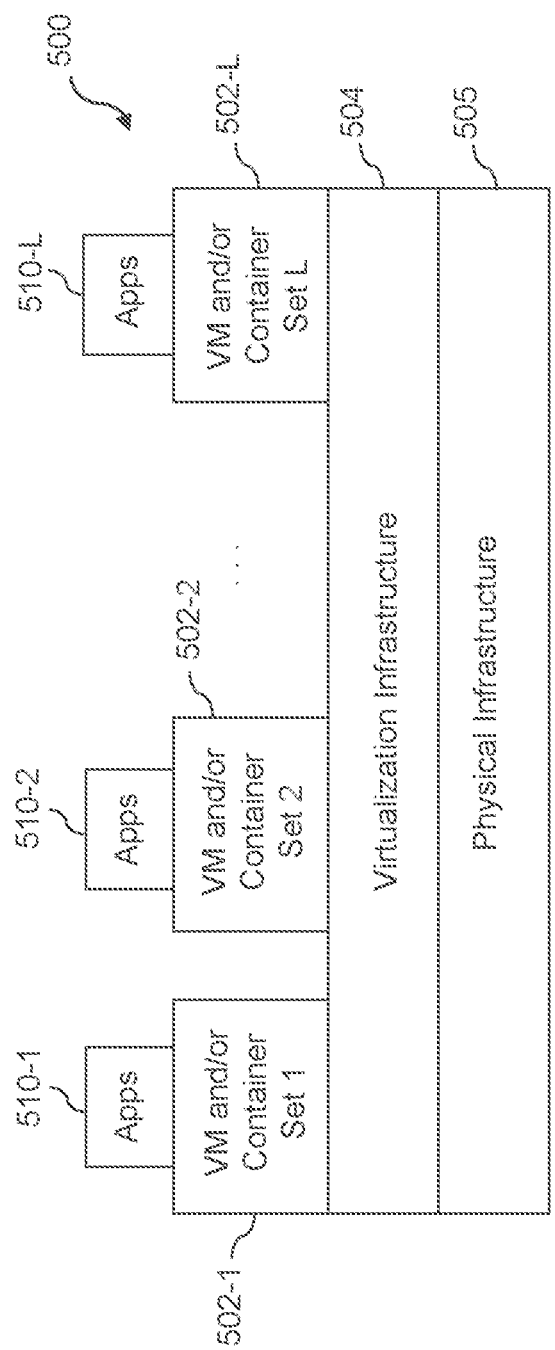
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the disruptive quote detection system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide disruptive quote detection functionality of the type described above for one or more processes running on a given one of the VMs. For example, each of the VMs can implement disruptive quote detection control logic and associated feature extraction for providing disruptive quote detection functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide disruptive quote detection functionality of the type described above for one or more processes running on different ones of the containers. For example, a container host device supporting multiple containers of one or more container sets can implement one or more instances of disruptive quote detection control logic and associated feature extraction functionality for use in detecting disruptive quotes.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
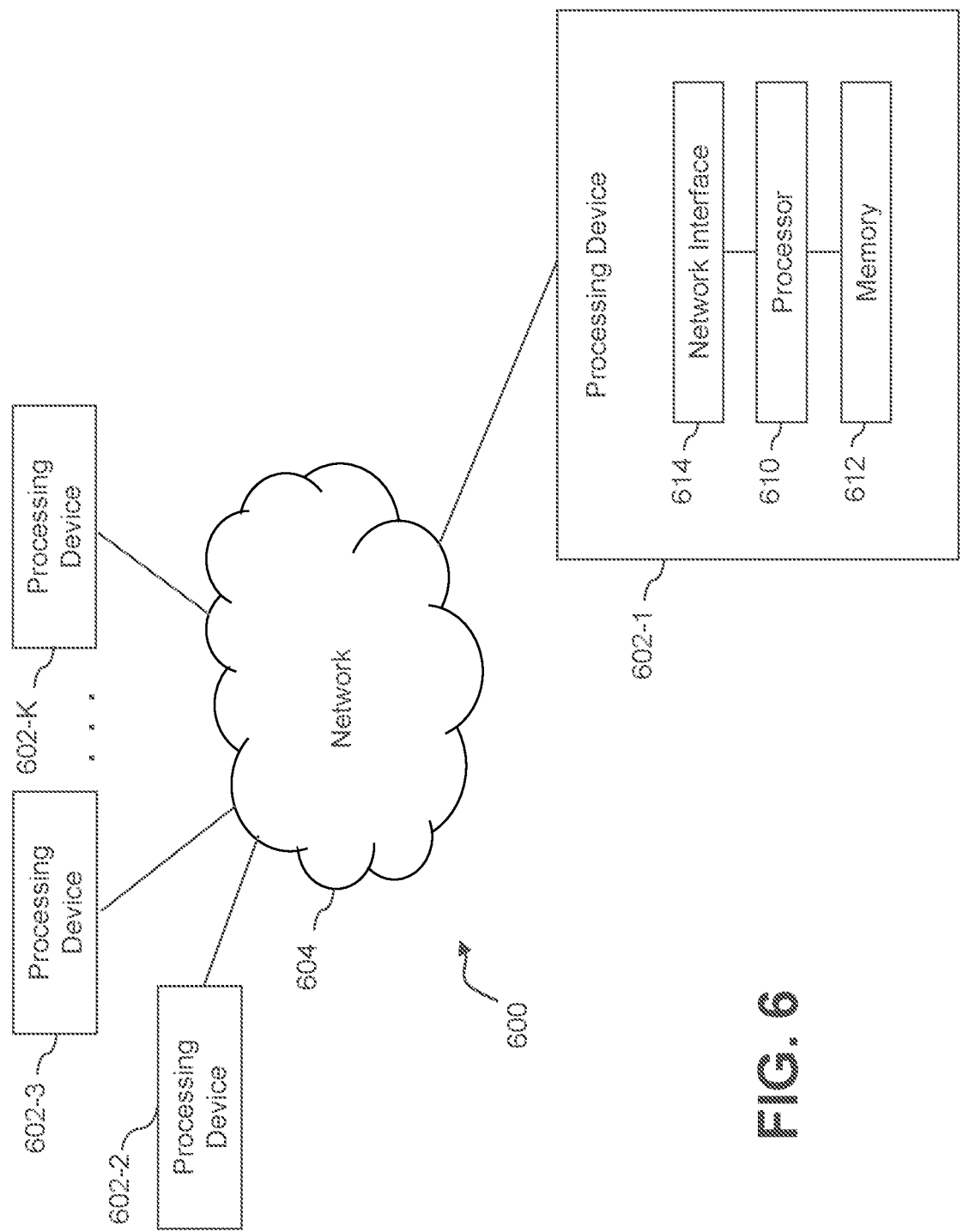
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining at least one data record associated with a request for at least one product;
   extracting one or more features from the at least one data record;
   applying the extracted features to a machine learning engine that generates an anomaly score indicating a likelihood that the at least one data record will cause a disruption, based on one or more predefined disruption criteria, wherein the machine learning engine is trained using historical order information to learn to identify at least one data record that will likely cause a disruption, wherein the disruption comprises a delay for one or more of the request and at least one additional request; and
   performing one or more automated actions based at least in part on the anomaly score;
   wherein the method is performed by at least one processing device comprising a processor coupled to a memory.

2. The method of claim 1, further comprising providing a user with one or more predefined factors that contribute to the anomaly score.

3. The method of claim 1, wherein a plurality of quotes is processed and the quotes within the plurality of quotes are sorted by the anomaly score.

4. The method of claim 1, wherein the machine learning engine employs one or more of an isolation forest algorithm and a multi-dimensional anomaly detection algorithm.

5. The method of claim 1, wherein the anomaly score is determined by comparing features of a given at least one data record associated with the request to historical data records associated with historical requests to determine where to rank the at least one data record associated with the request within the historical data records.

6. The method of claim 1, wherein the historical order information used to train the machine learning engine comprises part-level information of historical orders.

7. The method of claim 1, wherein training data for the machine learning engine further comprises a manufacturing production plan comprising an inventory forecast.

8. A computer program product, comprising a tangible machine-readable storage medium having encoded therein executable code of one or more software programs, wherein the one or more software programs when executed by at least one processing device perform the following steps:
   obtaining at least one data record associated with a request for at least one product;
   extracting one or more features from the at least one data record;
   applying the extracted features to a machine learning engine that generates an anomaly score indicating a likelihood that the at least one data record will cause a disruption, based on one or more predefined disruption criteria, wherein the machine learning engine is trained using historical order information to learn to identify at least one data record that will likely cause a disruption, wherein the disruption comprises a delay for one or more of the request and at least one additional request; and
   performing one or more automated actions based at least in part on the anomaly score.

9. The computer program product of claim 8, further comprising providing a user with one or more predefined factors that contribute to the anomaly score.

10. The computer program product of claim 8, wherein a plurality of quotes is processed and the quotes within the plurality of quotes are sorted by the anomaly score.

11. The computer program product of claim 8, wherein the machine learning engine employs one or more of an isolation forest algorithm and a multi-dimensional anomaly detection algorithm.

12. The computer program product of claim 8, wherein the anomaly score is determined by comparing features of a given at least one data record associated with the request to historical data records associated with historical requests to determine where to rank the at least one data record associated with the request within the historical data records.

13. The computer program product of claim 8, wherein the historical order information used to train the machine learning engine comprises part-level information of historical orders, and wherein training data for the machine learning engine further comprises a manufacturing production plan comprising an inventory forecast.

14. An apparatus, comprising:
   a memory; and
   at least one processing device, coupled to the memory, operative to implement the following steps:
   obtaining at least one data record associated with a request for at least one product;
   extracting one or more features from the at least one data record;
   applying the extracted features to a machine learning engine that generates an anomaly score indicating a likelihood that the at least one data record will cause a disruption, based on one or more predefined disruption criteria, wherein the machine learning engine is trained using historical order information to learn to identify at least one data record that will likely cause a disruption, wherein the disruption comprises a delay for one or more of the request and at least one additional request; and
   performing one or more automated actions based at least in part on the anomaly score.

15. The apparatus of claim 14, further comprising providing a user with one or more predefined factors that contribute to the anomaly score.

16. The apparatus of claim 14, wherein a plurality of quotes is processed and the quotes within the plurality of quotes are sorted by the anomaly score.

17. The apparatus of claim 14, wherein the machine learning engine employs an isolation forest algorithm.

18. The apparatus of claim 14, wherein the anomaly score is determined by comparing features of a given at least one data record associated with the request to historical data records associated with historical requests to determine where to rank the at least one data record associated with the request within the historical data records.

19. The apparatus of claim 14, wherein the historical order information used to train the machine learning engine comprises part-level information of historical orders.

20. The apparatus of claim 14, wherein training data for the machine learning engine further comprises a manufacturing production plan comprising an inventory forecast.

* * * * *